Nov. 23, 1926.
L. M. OAKLEY
1,607,997
FLOAT BALL VALVE
Filed August 8, 1922
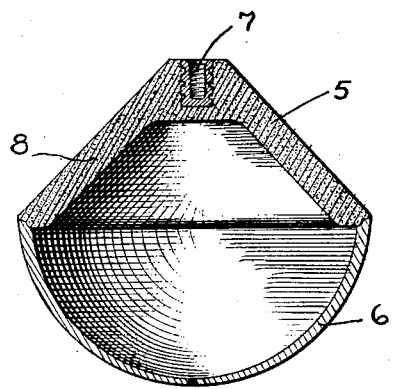
INVENTOR
LAURENCE M. OAKLEY
BY
*Emery Booth Janney & Varney*
ATTORNEY Patented Nov. 23, 1926.

1,607,997

UNITED STATES PATENT OFFICE.

LAURENCE M. OAKLEY, OF TRENTON, NEW JERSEY.

FLOAT-BALL VALVE.

Application filed August 8, 1922. Serial No. 580,392.

The present invention relates to float ball valves of the type used in flush tanks.

It is a desirable characteristic of a float ball valve for use in flush tanks that its lower seat engaging portion should be flexible and conformable to the valve seat to afford a tight joint and yet be rigidly supported at its upper edge to prevent spreading or collapse of the valve. It is further desirable that the ball valve should be relatively light in weight so that without being of undue size it will float buoyantly and will not be drawn prematurely to the valve seat by the discharge currents in a flush tank. If the ball has a low factor of buoyancy it may be drawn to the valve seat before the tank is completely discharged thus decreasing the efficiency of the tank. This is doubly objectionable because such a ball does not operate uniformly but sometimes permits a substantially complete discharge and at other times is drawn to its seat by water currents while considerable water remains in the tank.

In endeavoring to attain the first mentioned characteristic, ball valves have heretofore been made with a metal reinforcement in the upper half or the upper half has been made thick and has been semi-cured before attaching the lower half to afford a rigid relatively hard rubber top with a flexible bottom. In other instances the top has been reinforced with a piece of rubber of a different quality from the body of the valve thus providing a more or less rigid stiffening element. All these methods of stiffening the upper half of the ball have the disadvantage of increasing the cost of manufacture or producing an inferior article and the further disadvantage of increasing the weight and reducing the buoyancy of the valve.

Among other objects, the present invention is intended to provide a float ball valve combining rigidity of the top of the valve with a high degree of buoyancy of the valve as a whole in such manner that the ball valve may be manufactured economically and expeditiously. This and other objects of the invention will more fully appear from a description of a preferred embodiment thereof selected for purposes of illustration and shown in the accompanying drawing wherein the single figure is a central sectional view of a tank ball valve constructed in accordance with the invention.

The valve shown in the drawing consists of a thicker relatively stiff upper portion 5 preferably permanently united to a thinner relatively flexible seat engaging lower portion 6. A valve stem spud 7 is positioned in the top of the valve to receive the valve stem as usual.

The upper portion is made of rubber stock which is of low specific gravity but of a quality such that the desired stiffness and rigidity is afforded. I find it convenient to provide a rubber stock of this character by incorporating with raw rubber of good quality a filler of light weight such, for example, as fine ground cork or cork flour conventionally indicated by stippling 8. Satisfactory results have been obtained by the use of a rubber composition containing approximately thirty pounds of rubber of suitable quality, one and one-half pounds of sulphur, five pounds of suitable coloring matter, two and one-half pounds of calcined magnesia, ten pounds of fine ground cork or cork flour or a similar finely divided light material, and a few ounces of a suitable accelerator to shorten the time of cure. The above proportionate quantities and characters of ingredients are merely illustrative and considerable variation may be made therein while embodying the principle of the invention.

The lower seat engaging portion may if preferred be made of rubber of the type generally used in this part of the valve. Because of the thinness of this part, which thinness is desirable to afford flexibility, the specific gravity of the rubber has relatively little effect upon the weight of the ball as a whole and it is therefore not necessary that the lighter weight stock should be used.

Tank balls as above described can be manufactured by the usual methods employed for making balls, tank balls and the like; for example, sheets of the desired thickness and character for the top and bottom sections of ball valves may be preformed and retained in mold parts corresponding to the top and bottom valve sections and these mold parts with the sheets therein may be brought together to form the so-called biscuits, the edges of the mold cavities being suitably formed to unite the two rubber sheets and pinch off the surplus material as is usual in the manufacture of articles of this type. The biscuits may then be cured by curing in vulcanizing molds in the usual manner. If difficulty is experienced in obtaining adherence between the ball sections, cement or thin strips of rubber of suitable quality may be applied to one section along the line of the joint.

The above description is to be understood as merely illustrative of the invention as various modifications may be made without departing from the spirit of the invention as set forth in the claims.

I claim:

1. A light weight hollow flush tank ball valve comprising an upper relatively stiff portion of rubber stock of low specific gravity.

2. A light weight hollow flush tank ball valve having an upper relatively rigid portion comprising rubber stock about 20% of the weight of which consists of powdered cork and a lower relatively flexible seat engaging portion.

3. A light weight hollow flush tank ball valve having an upper relatively rigid portion comprising rubber stock of relatively low specific gravity and a lower relatively flexible seat engaging portion of rubber stock of relatively high specific gravity.

4. A light weight hollow flush tank ball valve comprising an upper relatively rigid portion of rubber stock having incorporated therein finely divided material of low specific gravity and a lower relatively yieldable seat engaging portion of rubber stock of relatively high specific gravity.

5. A light weight hollow flush tank ball valve having an upper relatively rigid portion comprising rubber stock having incorporated therein finely divided cork to reduce the specific gravity thereof.

6. A rubber flush tank ball valve having an upper supporting part and a lower seat engaging part, said upper part consisting of a relatively thick piece of rubber of low specific gravity and the lower part consisting of a relatively thin flexible piece of rubber of higher specific gravity.

7. A hollow flush tank ball valve comprising an upper portion of rubber stock containing about twenty per cent of finely divided material of low specific gravity and a bottom seat engaging portion of flexible rubber.

8. A hollow flush tank ball valve comprising an upper portion of relatively light weight and a bottom portion of flexible rubber forming a seat engaging portion.

In testimony whereof, I have signed my name to this specification this fifth day of August, 1922.

LAURENCE M. OAKLEY.